United States Patent [19]

Hüsch

[11] 4,420,274

[45] Dec. 13, 1983

[54] ELASTIC ARTICULATION, COUPLING OR THE LIKE

[75] Inventor: Bruno Hüsch, Bad Neuenahr-Ahrweiler, Fed. Rep. of Germany

[73] Assignee: Boge GmbH, Eitorf, Fed. Rep. of Germany

[21] Appl. No.: 231,724

[22] Filed: Feb. 5, 1981

[51] Int. Cl.³ .............................................. F16B 1/00
[52] U.S. Cl. ................................................. 403/227
[58] Field of Search ............... 403/227, 228, 225, 133, 403/226, 221

[56] References Cited

U.S. PATENT DOCUMENTS

| | | | |
|---|---|---|---|
| 1,952,115 | 3/1934 | Borst, Jr. | 403/227 X |
| 2,207,059 | 7/1940 | Herring | 403/221 X |
| 2,472,029 | 5/1949 | Thiry | 403/225 X |
| 2,705,643 | 4/1955 | Green | 403/227 X |
| 3,165,065 | 1/1965 | Stickel | 403/225 X |

FOREIGN PATENT DOCUMENTS

| | | | |
|---|---|---|---|
| 6606532 | 10/1970 | Fed. Rep. of Germany . | |
| 1955308 | 5/1971 | Fed. Rep. of Germany . | |
| 2520947 | 12/1975 | Fed. Rep. of Germany . | |
| 2434501 | 1/1976 | Fed. Rep. of Germany | 403/133 |
| 338359 | 6/1959 | Switzerland | 403/133 |
| 651134 | 3/1951 | United Kingdom | 403/227 |

*Primary Examiner*—Andrew V. Kundrat
*Attorney, Agent, or Firm*—William R. Hinds

[57] ABSTRACT

The elastic articulation or coupling or the like is of the type wherein a metallic inner part such as a ball or a cylindrical sleeve has an elastomeric body firmly adhered thereto, and in turn enclosed by the generally cylindrical interior of a metallic outer part such as a sleeve or an eye, the outer part being joined with the elastomeric body by axial clamping of a pair of annular metallic parts carried at the end faces of the elastomeric body, such that there is solely frictional engagement between the elastomeric body and the outer part. In known devices, various arrangements are provided on the outer peripheral surface of the elastomeric body to enhance the frictional adherence between the elastomeric body and the metallic outer part. An improved such arrangement is provided wherein a fabric of solid material, preferably metal wire, is embedded in the peripheral surface of the elastomeric body, with the fabric wire mesh running generally diagonally to the longitudinal axis of the coupling, such that the fabric together with the elastomeric body are axially compressed and clamped. The fabric with its meshes running essentially diagonally to the direction of prestressing is yieldable in diameter upon axial compression and clamping, such that the fabric moves advantageously evenly into the metallic outer part. This provides good frictional adherence.

12 Claims, 3 Drawing Figures

ELASTIC ARTICULATION, COUPLING OR THE LIKE

FIELD OF THE INVENTION

This invention relates to an elastic articulation, coupling or the like, with a metallic inner part such as a ball or a cylindrical sleeve, an elastomeric body formed of rubber or similar material joined with firm adherence thereto, and in turn being enclosed by a generally cylindrical metallic outer part such as a cylindrical sleeve or an eye, and is joined therewith solely by friction by axial clamping of a pair of annular metallic parts on the end faces of the elastomeric body. On the outer peripheral surface of the elastomeric body, means typically are provided to enhance the frictional adherence.

BACKGROUND AND SUMMARY

An elastic articulation of the type described above is known from German Gebrauchsmuster No. 6,606,532. Such elastic articulations, in which the inner part comprising a rubber/metal part and the rubber body is thrust into the outer part and held therein by axial clamping are suitable for mass production. The axial clamping of the rubber body is relatively simple to accomplish, in comparison, for example, to a known radial clamping of the outer part on all sides.

In the known elastic articulation as described, the arrangements on the outer peripheral surface of the elastomeric body for enhancing the frictional adherence typically are grooves that are provided axially or peripherally on the said peripheral surface. The depth of the grooves typically amounts to one-third of the thickness of the rubber. Thereby, according to information in the above-mentioned Gebrauchsmuster document, the rubber is moved perpendicularly in compression as well as tangentially to the grooves, whereby there is supposed to be a more favorable uniform distribution of compression with an advantageous groove design, and thereby an improved frictional adherence between the rubber body and the outer part. However, it has been found that these structural arrangements in known elastic articulations did not invariably lead to an adequate increase in frictional adherence. In particular, when there is strong axial stressing and clamping of the annular parts, the frictional adherence only allows an insufficient angle of rotation of the elastic articulation. When the maximum permissible angle of rotation is exceeded, the rubber body slides in the outer part, with pronounced abrasion. Accordingly, the known elastic articulations are believed to not have adequate fatigue strength, functional reliability or life expectancy, in line with modern requirements. It is also to be observed that because of the "grooves" that extend relatively deeply into the rubber, there are disadvantageous notching stress peaks in the known elastic joints.

The present invention is directed to the problem of creating a simple and efficient elastic articulation, coupling or the like that avoids many of the drawbacks of the known elastic joints and that is more simply and inexpensively mass produced, and having improved frictional adherence between the elastomeric body and the outer part, and hence an enlarged maximum angle of rotation, and improved fatigue strength.

This problem is solved in an elastic articulation of the type here involved in that, according to the invention, the outer peripheral surface of the elastomeric body has a fabric of solid material embedded in it, whereby the fabric together with the elastomeric body can be axially stressed and clamped. The fabric is preferably of metal wire oriented such that the meshes run essentially diagonally to the cylinder axis. In other words, the fabric can be in the nature of a wire screen, with the individual wires oriented diagonally to the cylinder axis. In accordance with a particularly advantageous embodiment of the invention, the fabric extends over the entire peripheral surface of the elastomeric body. It will be understood, of course, that in the context of the present invention, the term "fabric" also denotes a grid formed from the wire material.

The invention solves the problem to which it is directed in an optimum manner with very simple means. A fabric with meshes or wires that run essentially diagonally to the axial direction of prestressing is yieldable with increase of the diameter of the fabric sleeve upon axial clamping of the annular parts at the end faces of the elastomeric body and fabric sleeve, in contrast to a fabric having its meshes in an axial-radial orientation. Therefore, the fabric in accordance with the instant invention moves particularly evenly onto the outer part. As a result, there is an especially good frictional adherence between the elastomeric body and the outer part, substantially uniformly over the whole periphery, which makes possible a correspondingly large maximum admissable angle of rotation of the elastic joint. In comparison to the elastic articulation known from German Gebrauchsmuster No. 6,606,532, there is a given maximum angle of rotation according to the invention with substantially less axial clamping stress, or with a given axial clamping stress the maximum angle of rotation in the elastic articulation according to the invention is greater than in the case of the known joint. When the maximum permissable angle of rotation is exceeded, there is a practically abrasion-free sliding between the peripheral surface of the elastic body with the fabric, and the metallic outer part. Thus, the elastic articulation according to the invention has good fatigue strength, functional reliability and life expectancy. The application of the fabric on the surface of the rubber elastic body is simple and inexpensive even in mass production. Since the fabric is embedded uniformly in the surface of the elastic body, there are moreover practically no notching stresses therein.

From another publication, German Pat. No. 2,520,947, it is known in principal, in an elastic articulation with a structure generally like that of the devices here involved, that metallic ring inserts running axially can be disposed in the rubber. These rings, to prevent axial deformation in axial clamping of the rubber, do not extend over its whole axial extent, and are axially and radially staggered. With this known construction, which in no way affords the advantages of the present invention, there is supposed to be frictional adhesion between the rubber body and the inner part as well as between the rubber body and the outer part. Additionally, this known elastic joint is expensive and is poorly applicable to mass production, and furthermore the metallic inserts must be secured particularly against axial withdrawal. The publication could thus contribute nothing to the solutions achieved by the present invention.

From German Pat. No. 1,955,308, it is known in principal that an elastically or plastically deformable sheet sleeve with uniformly distributed perforations could be provided, whereafter an outer part would be applied about the sheet sleeve. This known elastic joint is quite different from the present invention, and is not finished by axial clamping of the rubber body, but rather by radial compression all around. For this, V-shaped notches with their tips directed toward the inner part are provided in the rubber, which produces pronounced notching stresses. In addition, as previously mentioned, a radially compressed elastic joint of this kind is relatively more cumbersome in manufacture, and thus lends itself less well to mass production. Another difference with respect to the instant invention lies in the fact that in the known articulation, supplementary perforated sheet sleeves have to be set into the rubber.

Advantageously in the elastic articulation according to the invention, utilizing a metal wire fabric, the width of the meshes, that is, the openings formed by the wire grid, is at least one millimeter, and the wire thickness advantageously is at least 0.2 millimeters, preferably 0.5 millimeters.

An especially advantageous construction results if, according to another characteristic of the invention, the annular clampable parts applied to the end faces of the rubber elastic body are disposed in the region of the adjacent faces of the fabric. This ensures that the fabric together with the rubber elastic body will be uniformly compressed axially.

Exemplary preferred embodiments of the invention are described in detail below with reference to the appended drawings.

DESCRIPTION OF PREFERRED EMBODIMENTS

Figure 1:
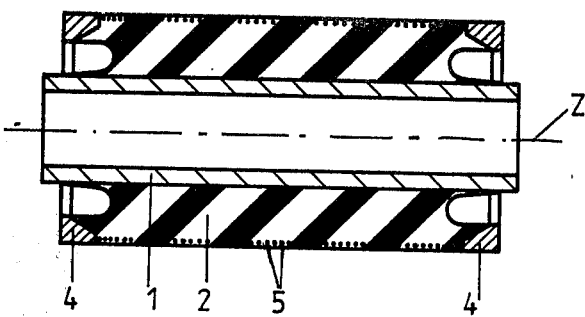
FIG. 1 shows in axial section an elastic turning articulation or coupling with the outer metal part omitted, before the axial clamping of the elastomeric body and the metal wire fabric embedded in its peripheral surface.
Figure 2:
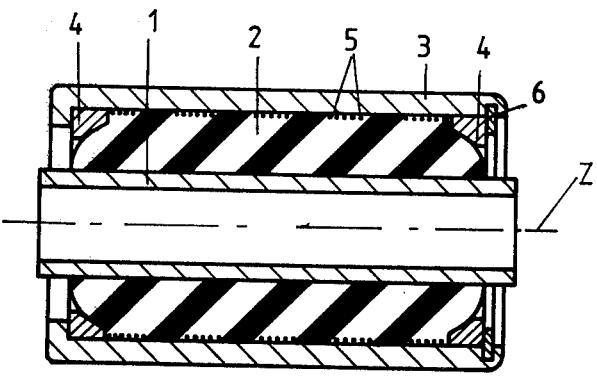
FIG. 2 shows the elastic articulation of FIG. 1, but with the outer metallic part mounted, and after the axial stressing and clamping of the elastomeric body.

The elastic turning articulation according to FIGS. 1 and 2 includes a metallic inner part 1 made as a cylindrical sleeve, with which an elastomeric body or rubber body 2 is joined in firm adhesion by vulcanizing. Elastomeric body 2 is surrounded by a metallic outer part 3, made as a cylindrical sleeve, and is connected therewith by axial clamping of a pair of annular metallic parts 4 on the faces of elastomeric body 2, the connection being solely by frictional adhesion. In accordance with the invention, for marked improvement of the frictional adhesion and increased fatigue strength, there is embedded in the outer peripheral surface of the elastomeric body 2 a metal wire fabric 5 with meshes that are oriented essentially diagonally with reference to cylinder axis Z, whereby the metal wire fabric 5 is axially clampable together with the elastomeric body 2. To optimize the advantages of the invention, metal wire fabric 5 extends over the entire peripheral surface of elastomeric body 2.

As an example of an embodiment that has been successfully tested in practice, the mesh width was 2 millimeters and the wire thickness 0.5 millimeters. Other values for mesh width (e.g. 1 to 5 millimeters) and wire thickness (e.g. 0.2 to 1 millimeter) are possible in principle, however.

Advantageously the compressible annular parts 4 applied to the end faces of elastomeric body 2 are disposed in the region of the adjacent ends of metal wire fabric 5. In particular, the outer diameter of annular part 4 is flush with the outer diameter of elastomeric body 2. Annular parts 4 are joined with the elastomeric body by vulcanizing.

To secure against working out of the axially compressed elastomeric body 2, there is a spring ring 6 disposed in outer part 3, in addition to annular parts 4.

Figure 3:
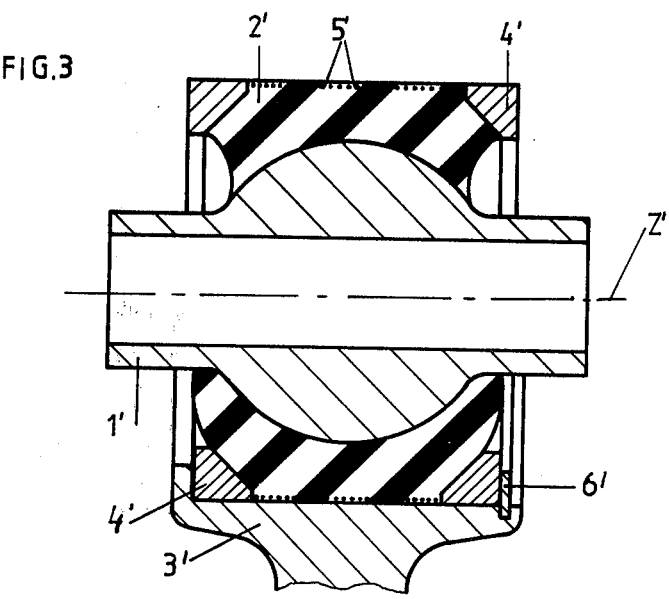
FIG. 3 shows in axial section an elastomeric ball joint according to the invention, wherein the illustration of the upper half of the articulation corresponds to the state of assembly as in FIG. 1, and that of the lower half shows the state of assembly according to FIG. 2.

The exemplary embodiment according to FIG. 3 differs from that of FIGS. 1 and 2 only in that the invention is embodied in FIG. 3 as an elastic ball joint. Accordingly, inner part 1' is made as a ball pin or rod while outer part 3' has the form of an eye. Otherwise, the structure and function of this elastic ball joint corresponds to the embodiment as in FIGS. 1 and 2.

Having thus described embodiments of my invention as required by the Statute, I claim:

1. An elastic articulated coupling comprising a relatively rigid inner member having a longitudinal axis, a relatively rigid outer member having a generally cylindrical interior surrounding said inner member with substantial clearance, an elastomeric body located in the clearance between the inner and outer members, said elastomeric body being connected firmly to said inner member and being in frictional engagement at its outer peripheral surface with the outer member, said elastomeric body having relatively rigid annular end members at its ends for movement independently of and relative to said inner member, means acting against said end members and axially compressing and clamping said elastomeric body, and a wire mesh fabric of a solid material embedded in the outer peripheral surface of the elastomeric body, the wire mesh of the fabric running generally diagonally to the axis of axial compression and clamping, and the fabric being clamped with the elastomeric body by said clamping means.

2. An elastic articulated coupling as claimed in claim 1, wherein said end members are disposed opposite the ends of said fabric.

3. An elastic articulated coupling as claimed in claim 2 wherein said clamping means are carried by said outer member.

4. An elastic articulated coupling as claimed in claim 3 wherein said wire mesh fabric is of metal wire, and said inner and outer and end members are of metal.

5. An elastic articulated coupling as claimed in claim 1 wherein said fabric extends over substantially the entire peripheral surface of said elastomeric body.

6. An elastic articulated coupling as claimed in claim 1 wherein said inner member is a sleeve.

7. An elastic articulated coupling as claimed in claim 1 wherein said inner member comprises the ball of a ball joint.

8. An elastic articulated coupling as claimed in claim 1 wherein said fabric is a metal wire fabric having a mesh width of at least one millimeter, the wires of the fabric being formed as a grid in which the wires are transversely disposed relative to each other, and the individual wires are diagonally oriented relative to the axis of axial compression and clamping.

9. An elastic articulated coupling as claimed in claim 8 wherein the thickness of the wire lies between 0.2 and 1 millimeter.

10. An elastic articulated coupling as claimed in claim 9 wherein the thickness of the wire is about 0.5 millimeters.

11. An elastic articulated coupling as claimed in claim 1 wherein said end members are connected to the ends of said elastomeric body.

12. An elastic articulated coupling as claimed in claim 1 wherein at least the radially outermost parts of said end members and the elastomeric body axially compressed and clamped therebetween are located relatively inwardly of the cylindrical interior of said outer member.

* * * * *

UNITED STATES PATENT AND TRADEMARK OFFICE
CERTIFICATE OF CORRECTION

PATENT NO. : 4,420,274
DATED : December 13, 1983
INVENTOR(S) : Bruno Husch

It is certified that error appears in the above-identified patent and that said Letters Patent is hereby corrected as shown below:

On the title page the following should be added

-- /30/ Foreign Application Priority Data

Feb. 5, 1980  /DE/  Fed. Rep. of Germany...3004075 --.

Signed and Sealed this

Twenty-seventh Day of March 1984

[SEAL]

Attest:

GERALD J. MOSSINGHOFF

Attesting Officer     Commissioner of Patents and Trademarks